Patented Feb. 13, 1951

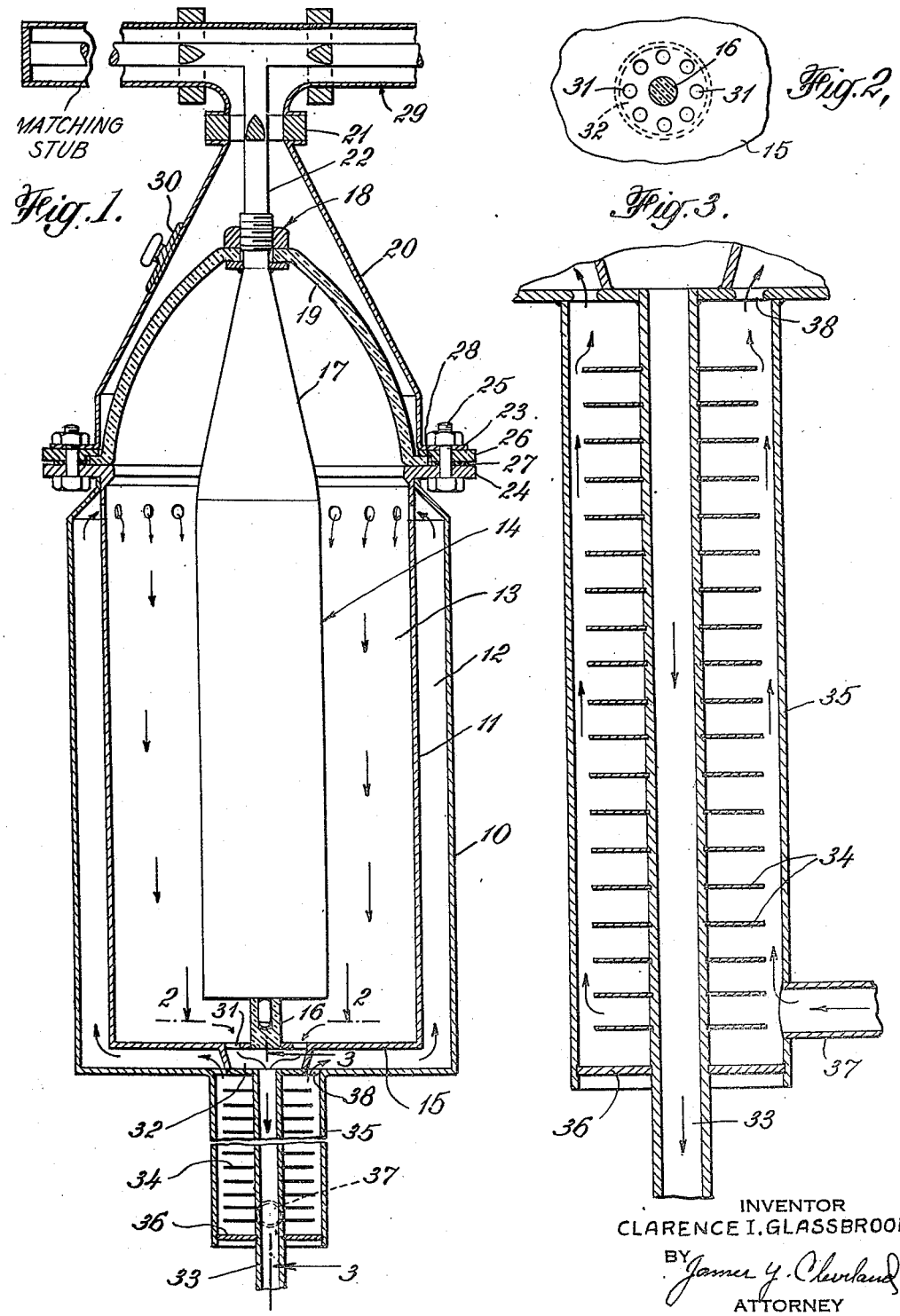

2,541,697

UNITED STATES PATENT OFFICE 2,541,697

ELECTRONIC REACTOR

Clarence I. Glassbrook, Swedesboro, N. J., assignor to Socony-Vacuum Oil Company, Incorporated, a corporation of New York Application October 3, 1946, Serial No. 700,949

1 Claim. (Cl. 204—312)

This invention relates generally to apparatus adapted for use in conducting chemical reactions and more specifically to apparatus for conducting chemical reactions electronically.

The use of electronic and high frequency energy to produce chemical reactions is well recognized in the prior art. Many devices have been proposed for conducting such reactions, for example, the Germans employ huge water-cooled arcs up to 7000 amperes in current density to effect reactions. Others have utilized high frequency discharges of various types.

All of the systems previously developed for this purpose suffer from a variety of difficulties. In the case of water-cooled arcs, erosion of equipment under intense electrical bombardment may become severe and the loss of energy to the cooling water is of considerable magnitude. In the case of spark discharges between sharp points, energy is radiated which is lost to the process and which creates a nuisance through interference in local radio and telephone channels.

When attempts are made to adapt previously designed equipment to high and ultra high frequencies, new difficulties confront the inventor. Conventional circuit elements such as, for example, water-cooled copper coils radiate excessively and show inherent losses. Similar losses are created within other parts of the system as a result of the presence of standing waves which cause difficulty as a result of dielectric breakdown.

The present invention overcomes the previously described disadvantages inherent in the prior art apparatus and provides the advantages of a reactor design suitable for use over a wide range of pressures including pressures above or below atmospheric such as, for example, from 0.1 micron of mercury to 2 atmospheres.

Since at high frequencies the size of the reactor is long compared to the wave length of the energy employed previous designs would be unsatisfactory due to the presence of standing waves in the equipment. Under such conditions excessive ionization might occur in one portion of the reaction zone while no ionization whatever would be obtainable in an adjacent portion of the reaction zone.

It is recognized that when high frequency energy is transmitted through a coaxial transmission line having a surge impedance $Z_0$ that standing waves will exist in such a system whenever the load attached to this line has an impedance other than $Z_0$. The maximum amount of energy will be transformed to the load as useful power when the load impedance $R_1$ exhibits purely resistive characteristics and satisfies the equation $$Z_0 = R_1$$

The above condition is attained in the present invention by a novel means for matching the impedance of the high frequency coaxial transmission line to the load, or the impedance of the electrodes in the reaction zone of the apparatus, by making the load a part of the line.

Other novel features of the present invention reside in the provision of novel means to utilize the heat imparted to the reactants in the reaction zone to preheat the reactants before they enter the reaction zone and to provide cooling means for the electrode system.

Electronically conducting chemical reactions with the above described apparatus is practised by causing the reactant material in gaseous state to move rapidly through an ionizing electrostatic field which is supplied by spaced concentric electrodes. The reactant material in passing through the ionizing field remains at relatively low temperatures and in practice seldom exceeds 200° C. Therefore all of the energy absorbed in the system appears as sensible heat in the reacted components and as chemical energy absorbed by the molecules of the gas.

Energy is supplied to the electrodes in the form of steady-state substantially sinusoidal waves of a selected frequency, or in the form of pulses of predetermined wave form.

The present invention finds application in all electronic processes for conducting chemical reactions which utilize high frequency electrical energy or pulses of electrical energy. Examples of such processes are those which employ "Electron Ballistics" and "Pulse" technique.

When employing the "Electron Ballistics" technique the mechanism of molecular disruption of molecules at low pressure and high frequencies is very complex. Instead of rupturing the molecules by electrical stress, electron bombardment is employed. The alternating high frequency electrostatic field produces motion of the free electrons in the gaseous components. A small number of free electrons are always present in a gas at low pressure being formed by ionization of molecules, by cosmic rays, natural radio activity, and by other mechanism such as thermal emission. These free electrons are accelerated by the radio frequency field. Collisions between the electrons, which have attained considerable velocity, and the gas molecules produce molecular fragments and more electrons by ionization of the gas molecules. A high speed electron colliding with a hydrocarbon molecule, methane for example, may have enough energy to completely disrupt the molecule forming hydrogen and carbon. This can of course only happen when the electron has extremely high velocity. Since the velocity of the electron can be controlled, these extreme velocities are not employed. The electrons, however, are accelerated to a velocity, measured in electron volts, that is high enough to strip methane to a CH fragment, 3 hydrogen atoms being lost in the process.

Several intermediate fractions are possible between $CH_4$ and CH when using a properly selected frequency. By properly controlling the frequency of the electrostatic field, the pressure and the velocity of the gases through the electrostatic field, the following reactions are possible when methane is used as a charging stock.

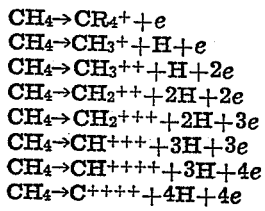

From the above it is apparent that the formation of charged ions by electron capture for example is common.

In carrying out reactions of the above type the energy supplied by the electrostatic field is of a frequency and voltage gradient so selected that the length of the path of travel of the accelerated electrons will be of the order of the mean free path of the reactant material and small in comparison to the distance between electrodes.

When employing the "Pulse" technique to electronically conduct chemical reactions in the reactor contemplated by the present invention, the mechanism of the reaction is also quite complicated. However, generally stated, reaction is achieved by admitting reactant material at a predetermined temperature to a reaction zone maintained at a predetermined pressure. While the material is in the zone it is subjected to one or more short pulses of electrostatic energy, each pulse being followed by a rest period of substantially greater duration than the duration of each pulse. The pulse of electrostatic energy produces molecular fragments which are allowed to recombine during the rest period to form molecules of the desired products.

From the above examples it is apparent that the present invention has broad application.

Therefore, the primary object of the present invention resides in the provision of an apparatus for electronically conducting chemical reactions.

Another object of this invention resides in the provision of an apparatus for utilizing high frequency electrostatic energy to conduct chemical reactions.

A further object of this invention resides in the provision of apparatus for conducting chemical reactions by the "Electron Ballistics" technique.

This invention also contemplates a novel reactor adapted for use in conducting chemical reactions by the "Pulse" technique.

Another object of the present invention resides in the provision of novel means for matching the impedance of the power transmission line supplying power to the system to that of the reactor load.

Still another object of the present invention resides in the provision of novel admission and discharge means for the reactants whereby the heat developed in the reaction zone and imparted to the products of reaction will be utilized to preheat reactant material as it is admitted to the reaction zone.

Other objects and advantages of the present invention will become apparent from the following detailed description when considered with the drawings, in which, Figure 1 is a vertical sectional view of the reactor showing my novel impedance matching means interposed between the power transmission line and the reactor electrodes, also showing in vertical section a fragment of the novel admission and discharge means for the reactants and products;

Figure 2 is a fragmentary cross-sectional view of the apparatus taken along the line 2—2 of Figure 1 showing the passageways through which reaction products are withdrawn from the reaction zone; and Figure 3 is an enlarged vertical sectional view of the heat exchanger which when considered with Figure 1 discloses the complete apparatus in vertical section.

Referring to the drawings in detail, particularly Figure 1, there is illustrated in vertical section an electronic reactor. The outer wall 10 of the reactor concentrically encloses a second wall 11 which serves as one of the electrodes of the system. Wall 11 is spaced from wall 10 to form a reactant admission passageway 12. The top of wall 11 is tapered inwardly and secured to wall 10.

An axially disposed central electrode 14 defines with the electrode or wall 11 the reaction zone 13. Central electrode 14 is supported by the bottom closure plate 15 of electrode 11 through means of an insulator 16. Insulator 16 may be formed of quartz, glass or other suitable material. The top portion 17 of electrode 14 is tapered upwardly at a critical angle and terminates in a bushing 18 which forms a gas tight seal between the top portion 17 of electrode 14 and a dome shaped hood 19. Hood 19 forms a closure for the top of the reaction chamber and may be formed of glass, quartz or other insulating material that is preferably transparent.

Disposed outside of the hood 19 and electrically connected to the electrode 11 is a conically shaped element 20. Element 20 is tapered upwardly from a diameter equal to the reaction chamber to a diameter equal to the diameter of the outer conductor of a coaxial transmission line. The upper end of element 20 terminates in a conventional coaxial cable connector 21. The central conductor of the coaxial cable connector 21 is connected by means of conductor 22 to the top end 17 of electrode 14 at the bushing 18. The bottom end of element 20 is provided with an outwardly extending flange 23 that is adapted to be secured to a similar flange 24 formed on the top of electrode 11 by means of bolts 25. There is interposed between flanges 23 and 24 an annulus 26 and a gasket 27. Annulus 26 is provided with an annular recess 28 that is adapted to receive a shoulder that is formed on the bottom edge of hood 19. When bolts 25 are drawn tight a gas tight seal is effected between the hood 19 and electrode 11 and an electrical connection is made between electrode 11 and tapered element 20. Tapered element 20 may be provided with a window 30 by means of which the reaction chamber can be viewed through the transparent hood 19.

Power is supplied to the electrodes 11 and 14 through the medium of a coaxial cable transmission line 29 and the elements 20 and 22. In many applications of the present invention the power supplied to the electrodes will be at ultra high frequency. In such cases standing waves will exist in such a system whenever the load, comprising the electrodes and reactant material, connected to this line has an impedance other than that of the coaxial transmission line. In order to eliminate these standing waves the reactor is in effect made a part of the transmission line by providing a proper impedance matching link between the transmission line and the electrodes of the reactor. Impedance matching is effected through the medium of tapered element 20 and the tapered top end 17 of electrode 14. The amount of taper given to element 20 and the upper tapered portion of electrode 14 is determined by the dielectric properties of the reactants, the glass dome 19 and the air trapped between element 20 and the glass dome 19. The graduated increasing space between the outer and inner conductor effects an impedance match between the load which comprises the reactor electrodes and the reactant material therebetween and the transmission line 29. Adjustment of this impedance match can be made to compensate for different dielectric properties of reactant materials in the conventional manner by means of short-circuiting matching stubs.

As shown in Figure 2, the bottom closure plate 15 of electrode 11 is provided with a plurality of passageways 31 which lead from the reaction chamber 13 to a small chamber 32, which in turn communicates with an outlet pipe 33. Outlet pipe 33 carries on its outer surface a plurality of heat exchange fins 34 that are adapted to radiate the sensible heat given off by reaction products that are withdrawn through the pipe 33 from the reaction zone 13. A passageway for reactant materials over the heat exchange fins 34 is defined by pipe 33 and a concentrically spaced outer wall 35 which is secured at its top end to the outer wall 10 of the reactor and is closed at its lower end by closure element 36. Reactant materials are admitted to the passageway through inlet pipe 37. The reactant materials pass upwardly over the fins 34 and enter the reactant admission passageway 12 through openings 38 formed in the bottom end of wall 10. With such an arrangement heat imparted to the products of the chemical reaction effected in the reaction zone is transferred to the reactant materials as they are charged into the reactor.

It is to be understood that the novel apparatus disclosed herein is not to be limited to electronic reactors which employ ultra high frequency electrical power but construed more broadly since it finds application to all chemical processes which utilize radiated electrostatic energy.

I claim:

An electronic reactor of the type adapted to use high frequency electrostatic energy that comprises in combination a pair of concentric spaced electrodes defining a reaction chamber, means for admitting reactant material to said reaction chamber, the reactant material and electrodes constituting an electrical impedance load when electrical power is supplied to said electrodes, a coaxial transmission line for transmitting power to the load, substantially coaxial impedance matching means consisting of two electrically conductive connecting members interposed between the transmission line and the load, each of said members being outwardly tapered from a diameter equal to that of the conductor of the coaxial transmission to which it is attached to a diameter equal to that of the electrode to which it is connected, whereby power reflections and standing waves will be eliminated and the electrostatic field in the reaction zone will be uniformly distributed.

CLARENCE I. GLASSBROOK.

REFERENCES CITED

The following references are of record in the file of this patent:

UNITED STATES PATENTS

| Number | Name | Date |
|---|---|---|
| 1,841,473 | Green | Jan. 19, 1932 |
| 1,930,210 | Nashan | Oct. 10, 1933 |
| 1,937,652 | Green | Dec. 5, 1933 |
| 2,257,177 | Luster | Sept. 30, 1941 |
| 2,334,377 | Bennett | Nov. 16, 1943 |
| 2,349,915 | Spillane | May 30, 1944 |
| 2,364,940 | Bies | Dec. 12, 1944 |

OTHER REFERENCES

Brainerd et al.: "Ultra-High-Frequency Techniques," (1942), pp. 360–364.

Certificate of Correction

Patent No. 2,541,697 February 13, 1951

CLARENCE I. GLASSBROOK

It is hereby certified that error appears in the printed specification of the above numbered patent requiring correction as follows:

Column 3, line 21, for "$CH_4 \rightarrow CR_4^+ + e$" read $CH_4 \rightarrow CH_4^+ + e$; column 4, line 12, for the word "my" read *the*;

and that the said Letters Patent should be read as corrected above, so that the same may conform to the record of the case in the Patent Office.

Signed and sealed this 17th day of July, A. D. 1951.

[SEAL]

ERNEST F. KLINGE,
*Assistant Commissioner of Patents.*